(12) United States Patent
Mao

(10) Patent No.: US 6,758,997 B1
(45) Date of Patent: Jul. 6, 2004

(54) METHOD OF FORMING A TRADE MARK ON A RIBBON STRIPE

(75) Inventor: Eric Mao, Taipei (TW)

(73) Assignee: Universal Trim Supply Co., Ltd., Taipei Hsien (TW)

( * ) Notice: Subject to any disclaimer, the term of this patent is extended or adjusted under 35 U.S.C. 154(b) by 0 days.

(21) Appl. No.: 09/513,116

(22) Filed: Feb. 25, 2000

(30) Foreign Application Priority Data

May 4, 1999 (CN) ........................................ 99105957 A

(51) Int. Cl.[7] .............................................. B29C 45/16
(52) U.S. Cl. ...................... 264/254; 264/255; 264/246; 264/247; 264/257; 264/273; 264/328.8
(58) Field of Search ................................. 264/267, 273, 264/324, 296, 425, 479, 494, 250, 254, 245, 246, 247, 255, 257, 328.8

(56) References Cited

U.S. PATENT DOCUMENTS

| | | | |
|---|---|---|---|
| 3,961,011 A | * | 6/1976 | Bramley |
| 4,115,489 A | * | 9/1978 | Macfee |
| 4,163,819 A | * | 8/1979 | Yung et al. ................. 428/198 |
| 4,230,757 A | * | 10/1980 | Toner |
| 4,259,272 A | * | 3/1981 | MacFee |
| 4,348,245 A | * | 9/1982 | MacFee |
| 4,735,753 A | * | 4/1988 | Ackermann |
| 5,419,475 A | * | 5/1995 | Naritomi |
| 5,964,009 A | * | 10/1999 | Hoepfl et al. ................. 16/430 |
| 6,139,787 A | * | 10/2000 | Harrison |
| 6,183,681 B1 | * | 2/2001 | Sullivan et al. |

FOREIGN PATENT DOCUMENTS

JP 57056209 * 4/1982

* cited by examiner

Primary Examiner—Mark Eashoo
(74) Attorney, Agent, or Firm—Leong C. Lei

(57) ABSTRACT

A method of forming a trade mark decoration on a soft ribbon stripe comprising the steps of thermal pressing a combination end of the ribbon stripe to cure the texture of the ribbon stripe and increase the gaps of the texture; fastening the combination end onto a mold; mixing ejection molding material with a material similar or alike the material of the ribbon stripe so that these materials can form as one unit when melt; high pressure ejection molding the ribbon stripe to combine with a primary blank plastic material and a produced trade mark pattern being formed on the primary blank plastic material; placing the first ejection molded primary blank plastic material into the mold for second ejection molding and the protruded trade mark pattern being located at a recess of the second mold; and processing to a second ejection molding to enclose the primary blank plastic material at the exterior thereof to form an ornamental article.

1 Claim, 4 Drawing Sheets

METHOD OF FORMING A TRADE MARK ON A RIBBON STRIPE

BACKGROUND OF THE INVENTION (a) Field of the Invention

The present invention relates to a trade mark ornamental pattern, and in particular, to a method of forming a trade mark pattern on a ribbon stripe, and where the ribbon body will not expose itself from a covering material.

(b) Description of the Prior Art

In the conventional method of covering a rigid article with a plastic material, the article is placed within a recess of a mold and then the plastic material is injected into the mold. Thus, the surface of the molded article is provided with a specific mark or logo.

However, if a soft ribbon stripe is to be provided with a plastic mark, it may have drawbacks. The ribbon stripe is a soft material and the end of the stripe cannot be effectively positioned. Under a high pressure injection process, the molded decoration is exposed from the ribbon stripe body after the molding process. Accordingly, these defective products cause an increase in production costs.

SUMMARY OF THE INVENTION

Accordingly, it is an object of the present invention to provide a method of forming a trade mark on a ribbon stripe, wherein defects caused during the production process can be controlled, and the cost of production be greatly reduced.

An aspect of the present invention is to provide a method of forming a trade mark decoration on a soft ribbon stripe, comprising the steps of thermal pressing a combination end of the ribbon stripe to cure the texture of the ribbon stripe and increase the gaps of the texture; fastening the combination end onto a mold; mixing injection molding material with a material similar to or identical with the material of the ribbon stripe so that these materials can form as one unit when melted; a high pressure injection molding of the ribbon stripe to combine with a primary blank plastic material and a protruded trade mark pattern being formed on the primary blank plastic material; placing the first injection molded primary blank plastic material into the mold for a second injection molding and the protruded trade mark pattern being located at a recess in the second mold; and processing to a second injection molding to enclose the primary blank plastic material at the exterior thereof to form an ornamental article.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 2:
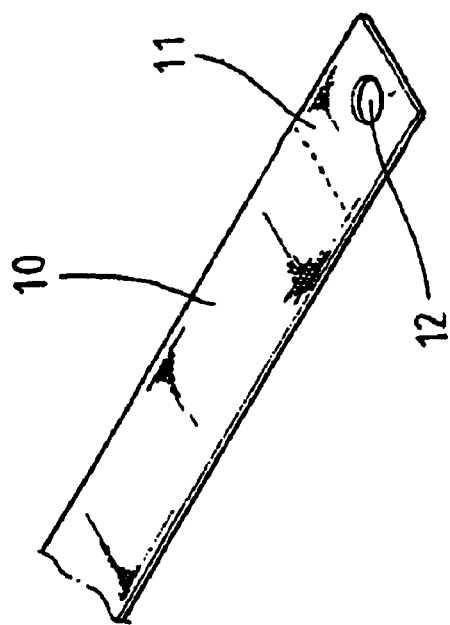
FIG. 2 is a perspective view of a second preferred embodiment of the ribbon stripe in accordance with the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1:
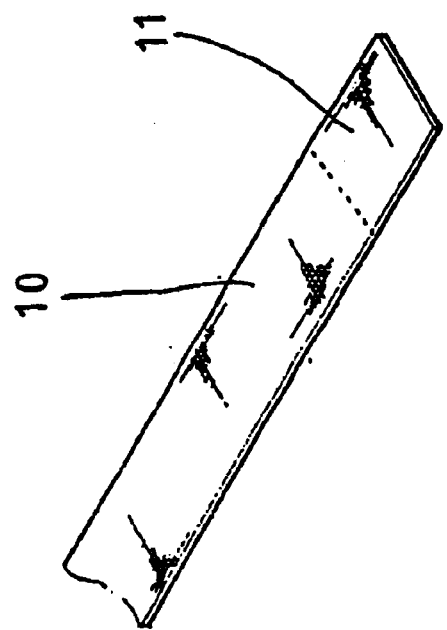
FIG. 1 is a perspective view of a ribbon stripe in accordance with the present invention.

Referring to FIG. 1, there is shown a ribbon stripe 10 used for the forming of a trade mark decoration thereon. In accordance with the present invention, a combination end 11 of the ribbon stripe 10 is thermally pressed (as shown in the FIG. 3A step). The ribbon stripe 10 undergoes the thermal pressing process at a temperature which does not melt the ribbon stripe 10. This process includes an ultra sonic fabrication method which causes the individual fiber units of the ribbon stripe 10 to cure to an appropriate extent. The extent of curing does not reach excessive stages such as the carbonization level, and breaking level.

Figure 3C:
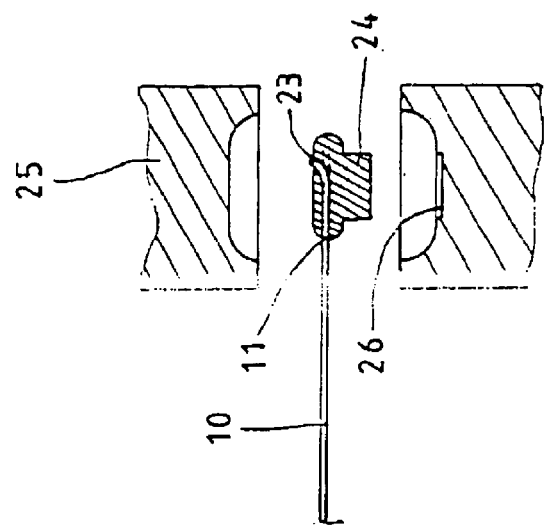
FIGS. 3A, 3B and 3C are schematic views showing the process of manufacturing the ribbon stripe in accordance with the present invention.
Figure 3B:
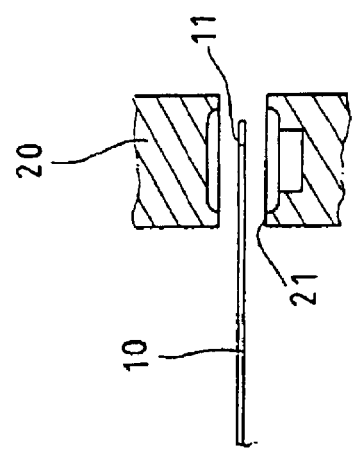
Figure 3A:
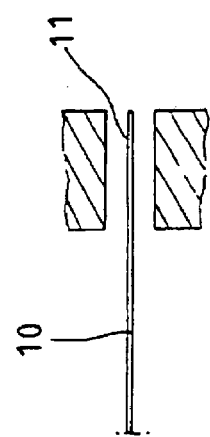

Referring to FIG. 3, the combination end 11 of the ribbon stripe 10 having been heat pressed is placed into a primary mold 20, and the circumferential edge 21 of the primary mold 20 grips the ribbon body of the combination end 11. By means of a first injection molding process, a primary blank plastic material 22 is formed at the end of the ribbon stripe 10.

In accordance with the present invention, before the injection molding of the primary blank plastic material 22, the material 22 has to be pressed and mixed with ribbon stripes or the like by a pressing machine to change the molecular structure of the first injection molding material, so that the molecular structure of the ribbon stripe and the outer enclosed primary blank material are formed as one unit during the process of melting.

Figure 4:
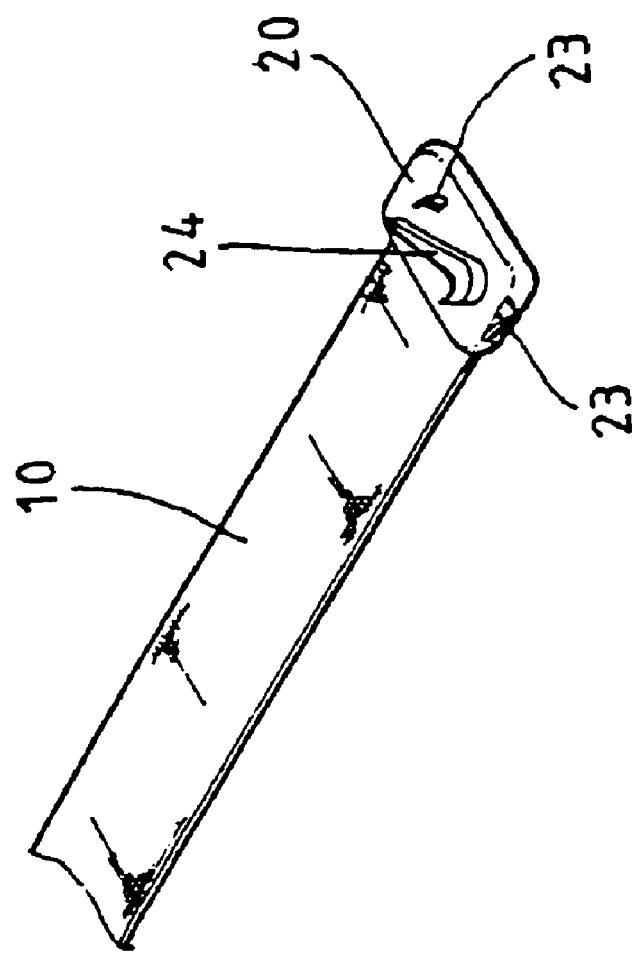
FIG. 4 is a perspective view of the primary blank material of the present preferred embodiment. (The trademark shown in the drawings is a registered trademark of the Nike Corporation).

Referring to FIG. 4, there is shown a completed first injection molded blank plastic material 22. As the ribbon stripe 10 is gripped at one edge, under a high pressure fabrication process, the ribbon body 23 may be exposed to the outside and the primary blank plastic material 22 at the surface is formed into a protruded trade mark pattern 24.

The primary blank plastic material 22 is then placed in a second mold 25 with the protruded trade mark pattern 24 located at a recess 26 of the second mold 25. The combination end 11 is secured by the circumferential edge of the mold and is secured at two positions.

Figure 5:
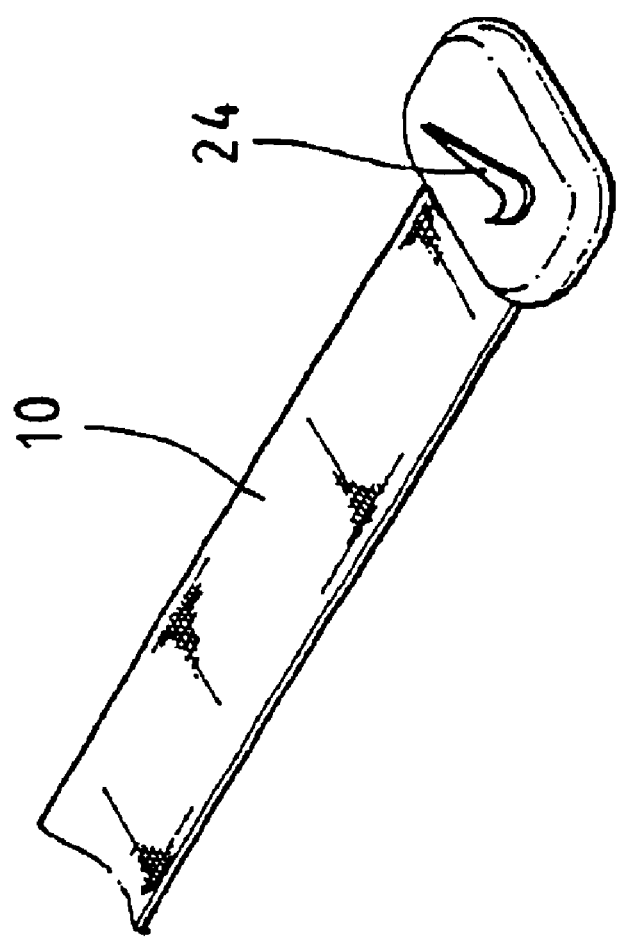
FIG. 5 is a perspective view of the completed ribbon stripe in accordance with the present invention. (The trademark shown in the drawings is a registered trademark of the Nike Corporation).

After the second injection process, the primary blank plastic material 22 is then covered again with plastic material so as to totally cover the ribbon body 23 and to form an aesthetic trade mark decoration (as shown in FIG. 5).

In accordance with the present invention, if the texture of the ribbon stripe 10 is rough and the thickness of the ribbon stripe is equal to or larger than 1 mm, the ribbon stripe 10 will be of a firm consistency once the combination end 11 has been thermally pressed.

The stripe 10 is suitable for combination. Accordingly, the ribbon body 23 will not be exposed beyond the blank material after the first covering of the molded primary blank plastic material 22. Hence, in accordance with the present invention, a fabricated ornamental article is obtained.

Referring to FIG. 2, the combination end 11 of the ribbon stripe 10 is provided with a hole 12 so that the plastic material for injection and covering can flow inside and combine to form as one unit.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of forming a trade mark decoration on a soft ribbon stripe comprising the steps of:

a. forming an opening at a combination end of the ribbon stripe;

b. thermal pressing the combination end of the ribbon stripe to cure a texture of the ribbon stripe;

c. fastening the combination end of the ribbon stripe onto a mold;

d. mixing injection molding material with a material having properties of the material of the ribbon stripe so that mixture of the materials can fully flow in the opening of the combination end of the ribbon stripe to combine with the ribbon stripe to form as one unit when melted;

e. injection molding of the mixture into the mold holding the combination end of the ribbon stripe in order to form a primary blank plastic material that includes a protruded trademark pattern; and f. placing the primary blank plastic material into a second mold where a second injection molding is injection molded over the primary blank plastic material where only the protruded trademark pattern of the primary blank plastic material is not covered by the second injection molding material.

* * * * *